5 Sheets—Sheet 1.

G. J. MURDOCK.

BOLT MACHINE.

No. 10,762. Reissued Sept. 7, 1886.

Witnesses:
I. Stail
Chas. H. Smith

Inventor:
George J. Murdock
per Lemuel W. Serrell
Atty.

N. PETERS, Photo-Lithographer, Washington, D. C.

G. J. MURDOCK.

BOLT MACHINE.

No. 10,762. Reissued Sept. 7, 1886.

Witnesses:
J. Stair
Chas. H. Smith

Inventor:
George J. Murdock
per Lemuel W. Serrell
Atty

N. PETERS, Photo-Lithographer, Washington, D. C.

5 Sheets—Sheet 3.

G. J. MURDOCK.

BOLT MACHINE.

No. 10,762. Reissued Sept. 7, 1886.

Witnesses:
I. Stail
Chas. N. Smith

Inventor:
George J. Murdock
per Lemuel W. Serrell
Atty

N. PETERS, Photo-Lithographer, Washington, D. C.

G. J. MURDOCK.

BOLT MACHINE.

No. 10,762. Reissued Sept. 7, 1886.

Witnesses:
J. Staib
Chas. H. Smith

Inventor
George J. Murdock
per Lemuel W. Serrell
Atty.

N. PETERS, Photo-Lithographer, Washington, D. C.

G. J. MURDOCK.
BOLT MACHINE.
No. 10,762. Reissued Sept. 7, 1886.
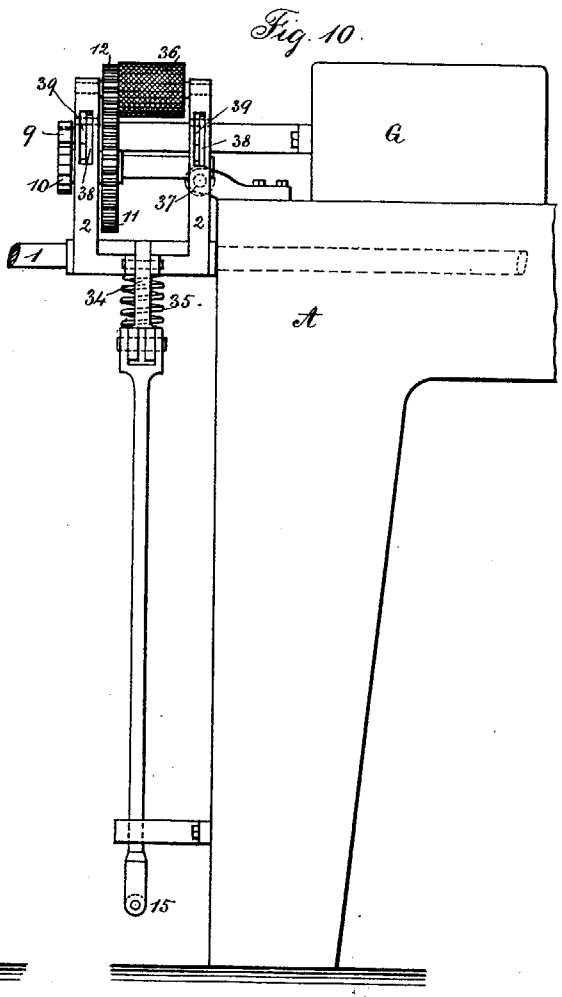
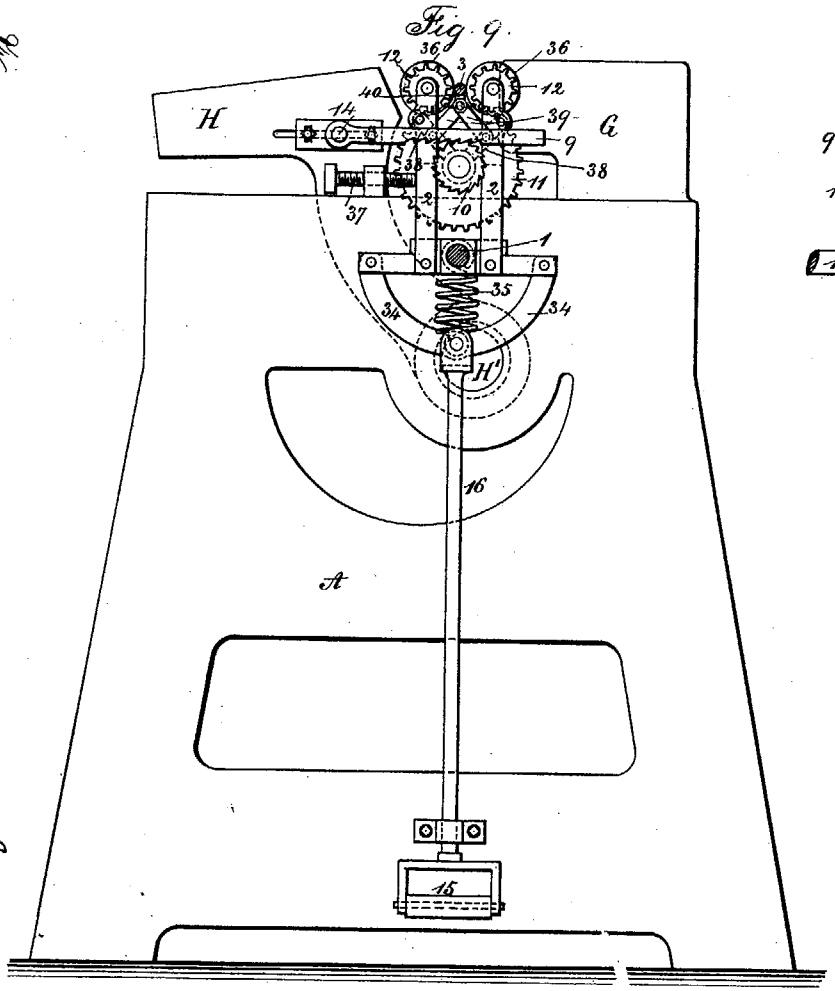
Witnesses:
J. Stait
Chas. H. Smith
Inventor:
George J. Murdock
per Lemuel W. Serrell Atty
N. PETERS. Photo-Lithographer, Washington, D. C.

UNITED STATES PATENT OFFICE.

GEORGE J. MURDOCK, OF NEW YORK, N. Y., ASSIGNOR TO CHARLES HALL, OF SAME PLACE.

BOLT-MACHINE.

SPECIFICATION forming part of Reissued Letters Patent No. 10,762, dated September 7, 1886.

Original No. 340,518, dated April 20, 1886. Application for reissue filed July 10, 1886. Serial No. 207,715.

*To all whom it may concern:*

Be it known that I, GEORGE J. MURDOCK, of the city and State of New York, have invented an Improvement in Bolt-Machines, of which the following is a specification.

In the manufacture of bolts with four, six, or eight sides the attendant has to partially revolve the bolt-rod between the opening and closing of the dies, so as to cause such dies to act upon the sides of the head successively. Mechanism has heretofore been proposed for accomplishing this object, but the same has been complicated and difficult to adjust.

In bolt-making machines such as that represented in Letters Patent No. 317,642, granted May 12, 1885, to Charles Hall and John Young, a swinging head-block with a die is made use of in connection with a stationary bearing-block and die. The bolt-rod is clamped by these dies, and the sides of the bolt-head are forged up to shape by such dies, in connection with a reciprocating heading-die.

The swinging head-block has a regular extent of motion; and my present invention relates to the combination, with the bearing-block and swinging head-block and dies, of mechanism to grasp and rotate the bolt-rod, and a connection between the swinging head-block and the revolving mechanism, whereby the motion to partially turn the bolt-rod is derived from the swinging head-block.

Figure 1:
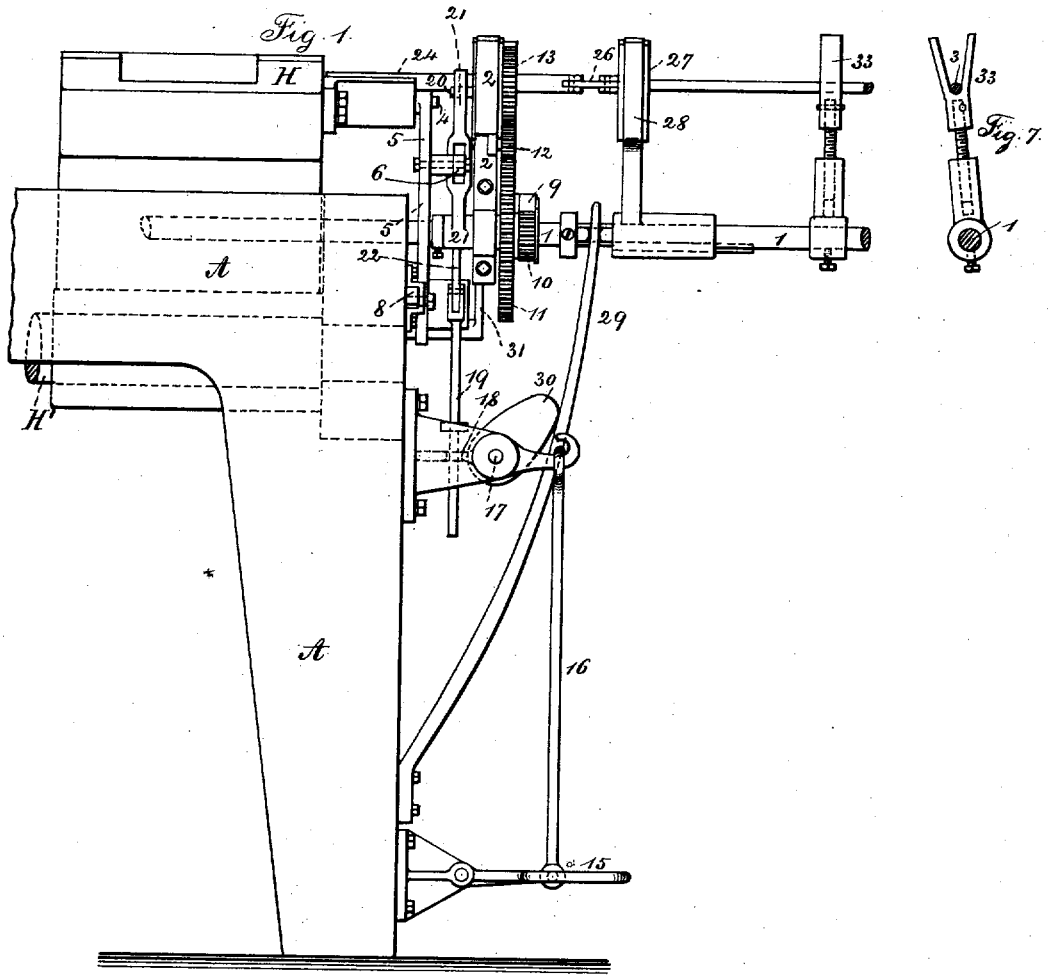
Figure 2:
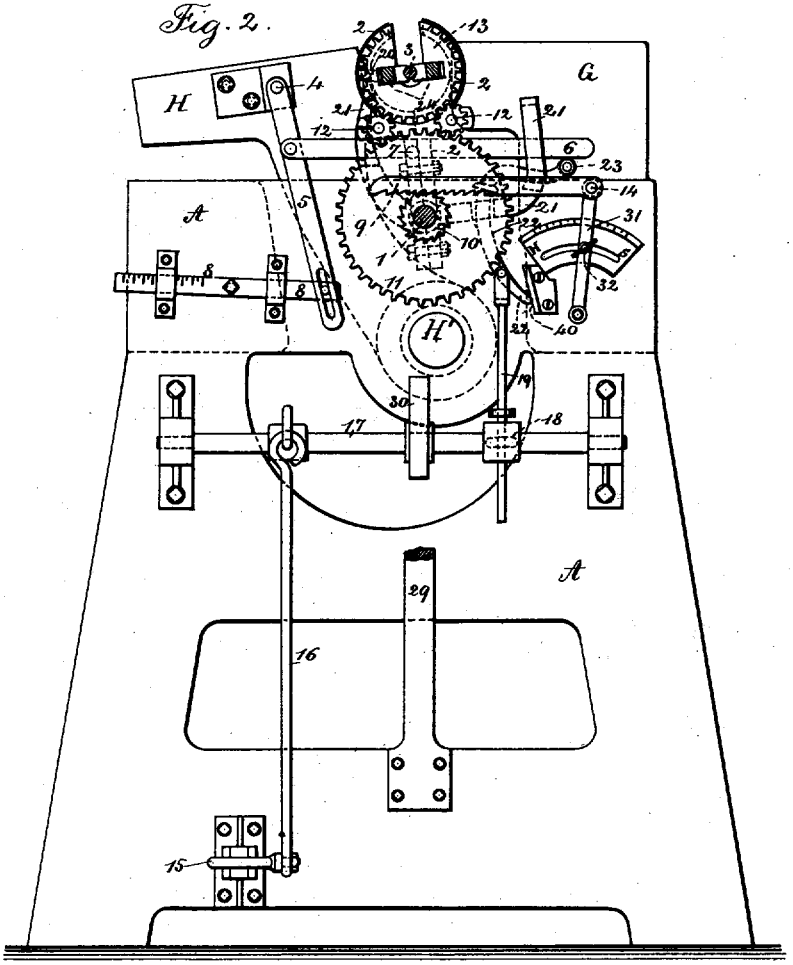
Figure 8:
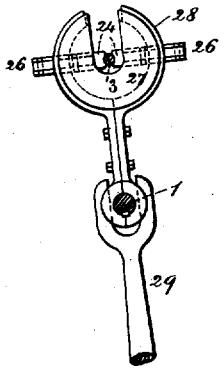
Figure 3:
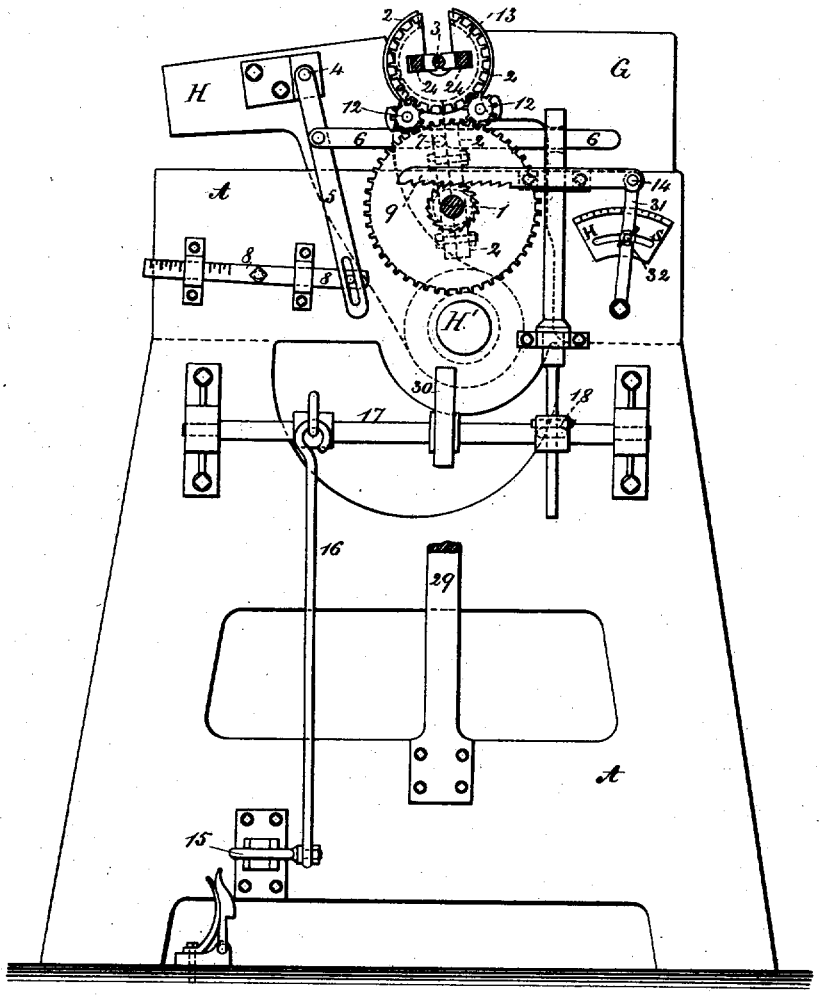
Figure 4:
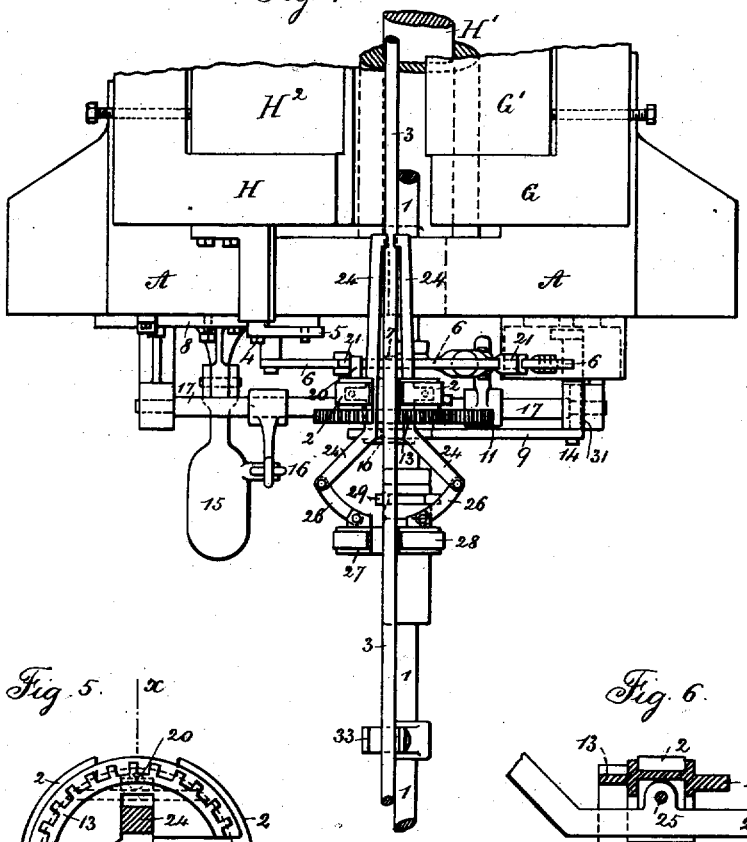
Figure 5:
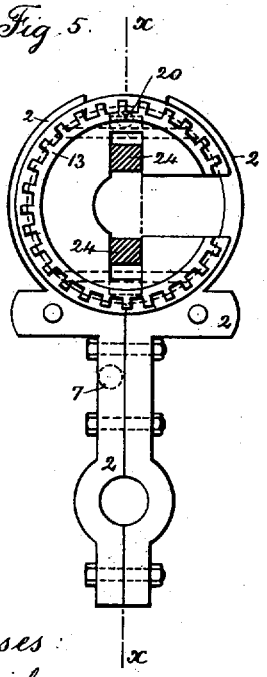
Figure 6:
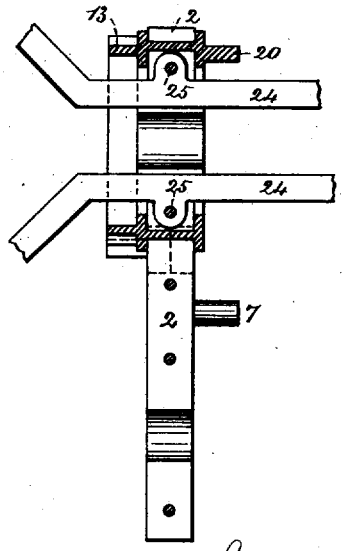

In the drawings, Figure 1 is a side view showing my improvements at the feeding end of the bolt-machine. Figs. 2 and 3 are elevations of the mechanism for holding and turning the bolt-rod, the parts in Fig. 3 being slightly varied from those in Fig. 2. Fig. 4 is a plan view of the turning mechanism. Fig. 5 represents the grasping-tongs in section, and shows the turning-gear and frame. Fig. 6 is a vertical section at the line *x x*, Fig. 5. Fig. 7 shows the rest for the bolt-rod. Fig. 8 is an elevation of the link-ring for the pinchers. Fig. 9 is an end view, and Fig. 10 a side view, of a modification of the grasping mechanism for the bolt-rod.

The bearing-block G, swinging head-block H, clamping-dies G′ and $H^2$, and the frame A and shaft H′ for the head-block H are substantially the same as in the aforesaid patent, and do not require further description, except to say that the head-block H receives its regular motion to open and close the clamping and forging dies.

I will first describe my improvements with special reference to Figs. 1 to 8. There is a shaft, 1, passing through the end frame, A, and upon this is a swinging frame, 2, that carries the mechanism that grasps and rotates the bolt-rod, so that as said frame 2 swings, when the die $H^2$ is swung back, the bolt-rod 3 is removed from the die G′, and it is free to be rotated.

Upon the swinging head-block H is a pivotal connection, 4, and from this hangs the lever 5, and to this lever 5 is hinged the notched bar 6, and there is a pin, 7, upon the frame 2, over which the notch of the bar 6 sets, and the lower end of the lever 5 is slotted to receive a pin upon the gage-bar 8, that is adjustable in loops upon the frame A. As the head-block H swings in opening the dies, the connection 4 swings the lever 5, and by the notched bar 6 and pin 7 the frame 2 is turned upon the stationary shaft 1, and in so doing the parts carried by the frame 2 are swung to move the bolt-rod 3 out of the die G′, and by adjusting the gage 8 the parts are placed so that the bolt-rod will be correctly swung back into the die G′ as the head-block H swings to close the dies. There is a rack-bar, 9, attached by a pivot, 14, to the lever 31, and this rack-bar has teeth that are beveled in one direction and engage the reversely-beveled teeth on the wheel 10, that is connected to or forms part of the motor-wheel 11. When the frame 2 is swung in one direction, as aforesaid, the motor-wheel 11 turns with it upon the shaft 1 by the friction of the parts upon said frame and in contact with the motor-wheel 11, and the teeth of the rack-wheel 10 slide under the rack-bar 9. When the frame 2 is swung the other way, the teeth of 9 and 10 engage, holding the motor-wheel 11 stationary, and the pinions 12, that are moved by and with the frame 2, are partially revolved by rolling against the stationary motor-wheel 11. From the turning of these pinions 12 the motion is communicated, as hereinafter described, to give to the bolt-rod 3 a partial rotation to turn it the amount necessary for forging four, six, or eight sided heads. I will, however, first describe the means for lifting the notched bar 6 to stop the swinging action and the consequent turning movement, whenever necessary, so that the movements of the bolt-machine may continue without turning the parts that act upon the bolt-rod. The treadle 15 is connected by a rod, 16, to an arm on the rock-shaft 17, so that said rock-shaft can be partially turned by the foot of the attendant. Upon this rock-shaft 17 is an arm, 18, and a lifter, 19. In Fig. 3 this lifter is shown as guided in slide-loops upon the frame A, and provided with a mortise at the upper end, through which the notched bar 6 passes, so that the attendant can lift the notched bar 6 off the pin 7, and stop the swinging movement of the frame 2, and allow the devices, hereinafter described, that grasp and rotate the bolt, to stand still until the foot is taken off the treadle. The same movement also opens the pinchers, and the bolt-rod can be taken out or replaced. The attendant may not open the pinchers and stop the swinging of the frame at the right time; hence I provide automatic means for stopping the swinging of the frame, as next described. The notched carrier-wheel 13 gives motion to the tongs 24, that hold the bolt-rod, as hereinafter described, and for inserting or withdrawing the bolt-rod it is most convenient for the notch in the carrier 13 to stand vertical, to give room for the bolt-head in withdrawing the rod. I place on this carrier 13 a pin, 20, and employ a bent lever, 21, pivoted on the shaft 1, and the right-hand end has a loop or fork, through which the notched bar 6 passes, and upon the lever 21 is pivoted a secondary lever, 22, with a roller, 23, below the bar 6, and to this lever 22 the lifter 19 is hinged. When the notched carrier has been revolved and the notch comes upwardly, the pin 20, acting through the bent lever 21, secondary lever 22, and roller 23, lifts the bar 6 automatically and raises it off the pin 7 to stop the swinging of the frame 2, and when the operator desires to start the rotation of the bolt-holding devices he places his foot upon the treadle, and by the lifter 19, that is connected with the secondary lever 22, raises such lever 22, lowering the roller 23, and allowing the notched bar 6 to fall and engage the swinging frame and give motion to the parts, as aforesaid. When the notched bar 6 is dropped by the action of the treadle, so that it engages the pin 7, the frame 2, motor-wheel 13, pinions 12, and bent lever 21, are all moved together and swing on the shaft 1, and to prevent the roller 23 again lifting the notched bar 6 the stationary stop 40 is used, against which the lower end of the bent lever 22 moves into contact, and that end being held against the swinging movement of the parts on the shaft 1 causes the lever 22 to turn and the roller 23 to move down and away from the notched bar 6, so that the same is not lifted thereby.

The swinging frame 2 is made as a circular notched bow to receive the circular bearing portion of the carrier-wheel 13, as seen in Fig. 6, and within this carrier-wheel are the pivots 25 of the pinchers 24, which pinchers extend out to near the jaws $G' H^2$, and are adapted to grasp the bolt-rod 3. The handles of the pinchers 24 are connected by the hinged links 26 to the link 27 in the notched yoke 28, which yoke stands upon the fixed shaft 1 and is guided by a feather, so that the yoke is kept in position but is free to be moved back and forth by the spring-arm 29, that has a fork at its upper end acting upon the notched hub of the yoke 28, and this spring-arm is fastened to the frame at the lower end, and is moved by a cam, 30, on the rock-shaft 17. The notched link-ring is free to revolve in the circular bow at the upper end of the yoke 28; hence, when the yoke 28 is slid along on the shaft 1 toward the motor-wheel 13 by the spring-arm 29, the links 26 act to close the pinchers and grasp the bolt-rod. When the cam 30 presses the yoke 28 the other way, the pinchers are opened. The carrier-wheel 13, pinchers, and link-ring 27 are, however, free to be revolved progressively, as aforesaid, by the pinions 12 as they roll over the motor-wheel 11, while the latter is held stationary by the rack-bar 9.

I remark that the rack-bar teeth and rack-wheel teeth are shown large for greater clearness. They will be sufficiently fine to hold the rack-wheel properly, and the pivot 14 of the rack-bar is upon a lever, 31, with a clamp-screw, 32, to adjust and hold such rack-bar, so that its teeth may occupy the proper positions for holding the rack-wheel. I prefer to use the supporting Y for the outer part of the rod, as shown at 33, Figs. 1 and 7, the same being upon the shaft 1 and provided with a screw for raising or lowering the Y to adapt it to different sizes of rods.

In Figs. 9 and 10 a modification of my improvement is illustrated. The frame 2, that swings on the shaft 1, is made in two parts, with bent lever ends, and the links 34 and contractile spring 35 act to move the upper ends of the frame toward each other, and upon these frames 2 are the pinions 12, gearing into the motor-wheel 11, and upon the motor-wheel axis is the rack-wheel 10, and the rack-bar 9 is pivoted the head-block H at 14. Upon the shafts of the pinion 12 are rollers 36, that grasp and revolve the bolt-rod 3. The parts swing upon the shaft 1, as before described, and the rack-bar 9, acting upon the wheel 10, draws the same and the frame, pulling the bolt-rod away from the die and bearing-block G, and when the frame 2 is arrested by the adjusting-screw 37 the further movement of the head-block H and rack-bar causes the teeth of 9 to turn the motor-wheel, pinions, and rollers 36, and partially revolve the bolt-rod. The amount of movement will depend upon the number of teeth that act upon the wheel 10 before the teeth separate, and the plain portion of the rack-bar rests on the teeth. When the bolt-rod is to be introduced or removed, the attendant places his foot on the treadle 15, and by the rod 16, attached to the links 34, draws apart the rollers 36. The axis of the motor-wheel 11 is preferably upon links 38, that are pivoted to the frames 2; and I also use links 39, that are united at their upper ends to the rest 40, for the bolt-rod 3. This rest is caused to descend as the rollers 36 are spread apart; hence it will cause the bolt-rod to be in line, or nearly so, with the axes of the rollers 36, whether the bolt-rod is large or small. The pivot 14 for the rack-bar 9 being adjustable, the time of separation of the teeth from the teeth of the wheel 10 can be determined by adjusting the pivot.

In Letters Patent No. 340,306, granted to Hall and Young for bolt-machine, there are fingers that move in opposite directions to give rotation to the bolt. The present invention is to be distinguished from the same because the bolt is grasped and held firmly by pinchers, and these pinchers themselves are rotated and rotate the bolt by a progressive movement.

I claim as my invention—

1. The combination, with a stationary and a swinging head-block and dies in a bolt-making machine, of a rack-bar, a rack-wheel, and motor-wheel acted on by such rack-bar and the movement of the head-block, and mechanism, substantially as specified, for giving motion to the bolt-rod and turning the same progressively as the forging of the head progresses, as set forth.

2. The combination, with the motor-wheel 11, of a notched carrier-wheel and pinchers pivoted to the notched carrier-wheel and grasping and progressively rotating the bolt-rod, substantially as set forth.

3. The combination, with the motor-wheel 11, of a notched carrier-wheel, pinchers pivoted to the carrier-wheel, links, and a link-ring, a yoke supporting the link-ring, and means for moving the yoke and acting on the pinchers, substantially as set forth.

4. The combination, with the swinging frame and motor-wheel, of the notched bar 6 and pin 7, and the mechanism, substantially as set forth, for grasping and rotating the bolt-rod, and the treadle and lifter for raising the notched bar and stopping the movements of the parts, substantially as set forth.

5. The combination, with the motor-wheel and carrier-wheel and the devices for turning the bolt-rod, of the swinging frame, the notched bar, the treadle and lifter, and the lever 21 and pin 20 on the carrier-wheel, for automatically raising the notched bar and stopping the rotating mechanism, substantially as set forth.

6. The combination, with the swinging frame and the pinions 12, of the motor-wheel 11, the rack-wheel and rack to give motion to the motor-wheel, the stationary head-block and die, and the moving head-block and die, by which the motor-wheel receives its movement, and mechanism, substantially as set forth, for grasping and progressively rotating the bolt-rod, substantially as set forth.

7. The combination, with the dies for grasping the bolt-rod and forging the head, of pinchers for grasping the rod and automatic mechanism for turning the pinchers, and thereby revolving the bolt-rod progressively, substantially as specified.

GEO. J. MURDOCK.

Witnesses:

CHAS. H. SMITH,

FRED. J. BEALE.